United States Patent
Wittenschlaeger (10) Patent No.: US 9,736,052 B2
(45) Date of Patent: *Aug. 15, 2017

(54) HYBRID TRANSPORT—APPLICATION NETWORK FABRIC APPARATUS

(71) Applicant: NANT HOLDINGS IP, LLC, Culver City, CA (US)

(72) Inventor: Thomas Wittenschlaeger, Flowery Branch, GA (US)

(73) Assignee: Nant Holdings IP, LLC, Culver City, CA (US)

(*) Notice: Subject to any disclaimer, the term of this patent is extended or adjusted under 35 U.S.C. 154(b) by 16 days.

This patent is subject to a terminal disclaimer.

(21) Appl. No.: 14/464,159

(22) Filed: Aug. 20, 2014

(65) Prior Publication Data

US 2014/0359094 A1    Dec. 4, 2014

Related U.S. Application Data

(63) Continuation of application No. 12/849,521, filed on Aug. 3, 2010, now Pat. No. 8,862,706, which is a
(Continued)

(51) Int. Cl.
*G06F 15/167* (2006.01)
*G06F 15/177* (2006.01)
(Continued)

(52) U.S. Cl.
CPC .......... *H04L 45/00* (2013.01); *G06F 9/54* (2013.01); *H04L 41/0823* (2013.01)

(58) Field of Classification Search
CPC ........ H04L 45/00; H04L 41/0823; G06F 9/54
(Continued)

(56) References Cited

U.S. PATENT DOCUMENTS 5,535,338 A    7/1996  Krause et al.
6,912,221 B1*  6/2005  Zadikian ............ H04L 12/5695
                                                        370/219
(Continued)

FOREIGN PATENT DOCUMENTS

WO        00/75788       12/2000

OTHER PUBLICATIONS

BROADCOM, "16-PORT, 256-GBPS HIGIG/HIGIG2 Switch Fabric", BCM56720 Product Brief, Broadcom Corporation, 2007, Irvine, CA.

*Primary Examiner* — Philip Chea
*Assistant Examiner* — Wing Ma
(74) *Attorney, Agent, or Firm* — Steven J Shattil (57) ABSTRACT

A hybrid routing—application network fabric apparatus is presented where a fabric apparatus has multiple apparatus components or resources that can be dedicated to one or more application topologies. The apparatus can receive a topology image definition file describing an application topology and the apparatus can dedicate its local components for use with the application topology. The apparatus can dedicate general purpose processing cores, dedicated routing cores, data channels, networking ports, memory or other local resources to the application topology. Contemplated application topologies include routing topologies, computation topologies, database topologies, storage topologies, or other types of application topologies. Furthermore, application topologies can be optimized by modeling or simulating the topologies on a network fabric.

21 Claims, 7 Drawing Sheets

Related U.S. Application Data continuation-in-part of application No. 12/556,263, filed on Sep. 9, 2009, now Pat. No. 8,364,744, which is a continuation of application No. 12/337,877, filed on Dec. 18, 2008, now Pat. No. 7,603,428, which is a continuation-in-part of application No. 12/122,018, filed on May 16, 2008, now Pat. No. 7,904,602, said application No. 12/849,521 is a continuation of application No. 12/552,186, filed on Sep. 1, 2009, now Pat. No. 8,189,496, which is a continuation of application No. 12/250,342, filed on Oct. 13, 2008, now Pat. No. 7,599,314, which is a continuation-in-part of application No. 12/120,024, filed on May 13, 2008, now Pat. No. 7,548,545.

(60) Provisional application No. 61/079,909, filed on Jul. 11, 2008, provisional application No. 61/038,380, filed on Mar. 20, 2008, provisional application No. 61/032,656, filed on Feb. 29, 2008, provisional application No. 61/026,415, filed on Feb. 5, 2008, provisional application No. 61/024,842, filed on Jan. 30, 2008, provisional application No. 61/023,004, filed on Jan. 23, 2008, provisional application No. 61/014,367, filed on Dec. 17, 2007, provisional application No. 61/014,306, filed on Dec. 17, 2007, provisional application No. 61/013,852, filed on Dec. 14, 2007, provisional application No. 61/289,141, filed on Dec. 22, 2009, provisional application No. 61/289,122, filed on Dec. 22, 2009, provisional application No. 61/289,006, filed on Dec. 22, 2009, provisional application No. 61/285,899, filed on Dec. 11, 2009.

(51) Int. Cl.
*H04L 12/701* (2013.01)
*H04L 12/24* (2006.01)
*G06F 9/54* (2006.01)

(58) Field of Classification Search
USPC .................................................. 709/221, 213
See application file for complete search history.

(56) References Cited

U.S. PATENT DOCUMENTS

| | | | |
|---|---|---|---|
| 7,013,084 B2 | 3/2006 | Battou et al. | |
| 7,020,145 B1 | 3/2006 | Symons et al. | |
| 7,082,477 B1* | 7/2006 | Sadhasivam | H04L 63/0428 370/392 |
| 7,116,665 B2* | 10/2006 | Balay | H04L 45/00 370/392 |
| 7,161,904 B2* | 1/2007 | Hussain | H04L 43/026 370/230 |
| 7,177,311 B1* | 2/2007 | Hussain | H04L 45/00 370/392 |
| 7,283,519 B2 | 10/2007 | Girard | |
| 7,340,535 B1* | 3/2008 | Alam | H04L 45/00 370/392 |
| 7,376,125 B1* | 5/2008 | Hussain | H04L 12/5693 370/352 |
| 7,565,416 B1* | 7/2009 | Shafer | H04L 41/0813 709/203 |
| 7,630,358 B1 | 12/2009 | Lakhani et al. | |
| 7,657,580 B2 | 2/2010 | Choquier et al. | |
| 7,693,976 B2 | 4/2010 | Perry et al. | |
| 7,702,717 B2 | 4/2010 | Jackson | |
| 7,725,629 B2 | 5/2010 | Sturm et al. | |
| 7,729,353 B1 | 6/2010 | Podolsky | |
| 7,869,442 B1* | 1/2011 | Kamboh | H04L 12/4641 370/400 |
| 2002/0083260 A1 | 6/2002 | McCormick et al. | |
| 2002/0147841 A1* | 10/2002 | Lee | H04L 45/06 709/241 |
| 2002/0174207 A1 | 11/2002 | Battou | |
| 2002/0194342 A1* | 12/2002 | Lu et al. | 709/227 |
| 2003/0023749 A1* | 1/2003 | Lee et al. | 709/240 |
| 2003/0043815 A1* | 3/2003 | Tinsley et al. | 370/395.21 |
| 2003/0101426 A1* | 5/2003 | Sarkinen et al. | 716/12 |
| 2004/0019696 A1* | 1/2004 | Scott | H04L 29/06 709/242 |
| 2004/0122973 A1* | 6/2004 | Keck | H04L 12/2602 709/238 |
| 2004/0210623 A1 | 10/2004 | Hydrie et al. | |
| 2005/0281275 A1* | 12/2005 | Haghighi | H04L 49/254 370/401 |
| 2006/0080318 A1 | 4/2006 | Huston et al. | |
| 2006/0092832 A1 | 5/2006 | Santoso et al. | |
| 2006/0146808 A1* | 7/2006 | Campini et al. | 370/360 |
| 2006/0227771 A1 | 10/2006 | Raghunath et al. | |
| 2007/0094378 A1 | 4/2007 | Baldwin et al. | |
| 2007/0171917 A1 | 7/2007 | Dai | |
| 2008/0184021 A1* | 7/2008 | Wilson | G06F 13/4022 713/2 |
| 2009/0228418 A1* | 9/2009 | Ramesh et al. | 706/46 |
| 2009/0228684 A1* | 9/2009 | Ramesh et al. | 712/29 |
| 2010/0091780 A1 | 4/2010 | Varanasi et al. | |
| 2010/0094981 A1 | 4/2010 | Cordray et al. | |
| 2010/0111088 A1 | 5/2010 | Olofsson | |
| 2011/0243144 A1 | 10/2011 | Kwon et al. | |

* cited by examiner

HYBRID TRANSPORT—APPLICATION NETWORK FABRIC APPARATUS

This application is a continuation of U.S. patent application Ser. No. 12/849,521 filed Aug. 3, 2010 which is a continuation-in-part of U.S. patent application Ser. No. 12/556,263 Sep. 9, 2009 now U.S. Pat. No. 8,364,744 issued Jan. 29, 2013 which is a continuation of U.S. patent application Ser. No. 12/337,877 filed Dec. 18, 2008 now U.S. Pat. No. 7,603,428 issued Sep. 23, 2009 which claims the benefit of U.S. provisional application 61/079,909 filed Jul. 11, 2008 and is a continuation-in-part of U.S. patent application Ser. No. 12/122,018 filed May 16, 2008 now U.S. Pat. No. 7,904,602 issued Feb. 16, 2011 which claims the benefit of U.S. provisional application 61/038,380 filed Mar. 20, 2008 and claims the benefit of U.S. provisional application 61/032,656 filed Feb. 28, 2008 and claims the benefit of U.S. provisional application 61/026,415 filed Feb. 5, 2008. U.S. patent application Ser. No. 12/849,521 claims the benefit of U.S. patent application Ser. No. 12/552,186 filed Sep. 1, 2009 now U.S. Pat. No. 8,189,496 issued May 10, 2012 which is a continuation of U.S. patent application Ser. No. 12/250,342 filed Oct. 13, 2008 now U.S. Pat. No. 7,599,314 issued Oct. 6, 2009 which is a continuation-in-part of U.S. patent application Ser. No. 12/120,024 filed May 13, 2008 now U.S. Pat. No. 7,548,545 issued Jan. 16, 2009 which claims the benefit of U.S. provisional application 61/024,842 filed Jan. 20, 2008 and claims the benefit of U.S. provisional application 61/023,004 filed Jan. 23, 2008 and claims the benefit of U.S. provisional application 61/014,367 filed Dec. 17, 2007 and claims the benefit of U.S. provisional application 61/014,306 filed Dec. 17, 2007 and claims the benefit of U.S. provisional application 61/013,852 filed Dec. 14, 2007. U.S. patent application Ser. No. 12/849,521 claims the benefit of U.S. provisional application 61/289,141 filed Dec. 22, 2009 and claims the benefit of U.S. provisional application 61/289,122 filed Dec. 22, 2009 and claims the benefit of U.S. provisional application 61/289,006 filed Dec. 22, 2009 and claims the benefit of U.S. provisional application 61/285,899 filed Dec. 11, 2009.

These and all other extrinsic materials discussed herein are incorporated by reference in their entirety. Where a definition or use of a term in an incorporated reference is inconsistent or contrary to the definition of that term provided herein, the definition of that term provided herein applies and the definition of that term in the reference does not apply.

FIELD OF THE INVENTION

The field of the invention is networking technologies.

BACKGROUND

With the ever increasing growth in computational power of computing technology, devices can be built having computational capabilities exceeding the device's I/O throughput, thus creating a reserve of excess computing power. Strangely, networking companies continue to develop dedicated devices configured with a single functional purpose: networking. Networking devices, switches or routers for example, simply focus on providing data transport across a network, possibly at high data rates even exceeding 10 Gbit/s.

Data rates over network fabrics are becoming commensurate with computer bus speeds and have extremely low latency. For example, ER-1010E switches produced by Raptor Networks Technology Inc. can provide data transport across geographical distances with an aggregated link throughput of up to 80 Gbit/s with box latencies of less than 5 µs. Not only can such devices from a fabric that can serve as a computing bus among connected computing elements, but can also provide computational support as discussed in the Applicant's previous patent filings.

Networking fabric devices have barely begun to meet their full potential. Fabrics comprising suitably configured networking devices can extend their capabilities beyond mere data transport functions into myriad other types of applications including storing data, providing security, running computational simulations or models, searching, or other types of applications. Although the Applicant's previous patent filings touch on some of these application areas at a fabric level, there are still areas to be pursued at the device level. For example, an application can be deployed on a topology comprising of dedicated apparatus-level components operating together to provide support for the application's requirements. Each device can locally manage its contribution to one or more different types of topologies while still providing full data transport capabilities.

The following references describe previous effort put forth toward managing or configuring networking devices.

U.S. Pat. No. 7,702,717 to Jackson titled "Method and Apparatus for Controlling Management Agents in a Computer System on a Packet-Switched Input/Output Network" filed on Mar. 27, 2003, describes configuring nodes on a packet-switch network, where each node can have a plurality of processing cores. The processing nodes are able to run a subnet management agent, which can be moved from processing node to processing node.

U.S. Pat. No. 7,637,580 to Choquier et al. titled "System and Method Providing Virtual Applications Architecture" filed Jul. 20, 2005, discusses using a topology manager for managing applications across members of an architecture.

U.S. patent application publication 2010/0094981 to Cordray et al. titled "Dynamically Deployable Self Configuring Distributed Network Management System", filed Oct. 13, 2009, discusses managing networks by automatically transferring management policies or applications upon detection of new devices.

U.S. Pat. No. 7,630,358 to Lakhani et al. titled "Mechanism for Implementing Multiple Logical Routers within a Single Physical Router", filed Jul. 9, 2010, and discusses using a topology manager to provide routing tables to line cards in a router.

U.S. Pat. No. 7,130,084 to Battou et al. titled "Multi-Tiered Control Architecture for Adaptive Optical Networks and Methods and Apparatus Therefor", filed Feb. 28, 2001, describes a topology manager that keeps track of an arrangement of physical connectivity of switches in a network.

Interestingly, the above references fail to appreciate that a network fabric can operate as a computational application engine, where an application executing or otherwise operating within the fabric can function within its own application topology. Furthermore, these and other known approaches fail to address issues where different types of topologies can co-exist or interact with each other even at a component level of a single fabric apparatus. What has yet to be appreciated is that a single hybrid fabric apparatus (e.g., a switch, a line card, a chip, etc.) can include multiple routing or processing cores that can be individually dedicated to different topologies. Multiple fungible apparatus can cooperate together to form routing topologies configured for data transport while also supporting other application topologies (e.g., computation, storage, simulation, modeling, searching, etc.) at the same time.

Thus, there is still a need for hybrid routing—computation apparatus capable of supporting multiple computing application topologies.

SUMMARY OF THE INVENTION

The inventive subject matter provides apparatus, systems and methods in which an apparatus can operated according to more than fabric level topologies through allocating one or more local apparatus components to the topologies. One aspect of the inventive subject matter includes a hybrid routing—computation fabric apparatus having general purpose processing cores, network routing cores, networking ports, and a topology manager. In some embodiments, the general purpose cores can be communicatively coupled with the networking cores via one or more selectable internal data channels. The topology manager can be configured to coordinate construction, maintenance, or otherwise manage multiple, even distinct, topologies with other hybrid fabric apparatus. The apparatus can support many different types of topologies including routing topologies (e.g., data transport), storage topologies providing access to storage devices (e.g., RAID, NAS, SAN, etc.), computation topologies, simulation topologies, or even modeling topologies. When constructing a topology, the topology manager can dedicate local apparatus components to each topology. For example, the topology manager can allocate a general processor core, a routing core, a network port, or a selectable data channel to a computation topology. In addition the topology manager can dedicate a routing core and two network ports to a routing topology.

Contemplated apparatus can take on many different forms. In some embodiments, the apparatus comprises a standalone appliance, while in other embodiments the apparatus can include one or more modular components coupled with each other. Still, in yet other embodiments, the apparatus can be packaged within a chip form factor (e.g., a multi-core processor), possibly for use within the module component or standalone appliance. One appliance that would be suitable for use with the disclosed subject matter includes a distributed core networking switch.

The topology manager can be configured to interact with other topology manager resident on other fungible hybrid routing—computation fabric apparatus. A topology image file can be distributed among topology member apparatus, where the topology image file describes a fabric level topology across the member apparatus of the topology. The topology manager can select which local apparatus components should be dedicated to the topology based on the topology image.

In some embodiments, contemplated apparatus can also include an optimization agent configured to monitor one or more metrics associated with an aspect of a topology's performance. The agent can monitor efficiency of the topology based on observing metrics, global fabric metrics or local apparatus metrics. The agent can estimate a new efficiency based on a topology reconfiguration. The estimated efficiency can be estimated through simulating the topology or possibly through modeling the topology. Should the new estimated efficiency satisfy efficiency criteria, the topology manager can reallocate local apparatus components according to the reconfiguration.

Various objects, features, aspects and advantages of the inventive subject matter will become more apparent from the following detailed description of preferred embodiments, along with the accompanying drawing figures in which like numerals represent like components.

DETAILED DESCRIPTION

It should be noted that while the following description is drawn to a network fabric devices, apparatus, nodes, or other networking device. One should appreciate the networking devices can comprise a processor or processing cores configured to execute software instructions stored on a tangible, non-transitory computer readable storage medium (e.g., hard drive, solid state drive, RAM, flash, ROM, etc.). The software instructions preferably configure the networking device to provide the roles, responsibilities, or other functionality as discussed below with respect to the disclosed apparatus. In especially preferred embodiments, the various device exchange data using proprietary or standardized protocols or algorithms, possibly based on know techniques including Ethernet, IP, TCP/UDP, HTTP, HTTPS, AES, public-private key exchanges, web service APIs, known financial transaction protocols, or other electronic information exchanging methods. Data exchanges preferably are conducted over a packet-switched network fabric, possibly operating independent of, in conjunction with, or over the Internet, LAN, WAN, VPN, or other type of packet switched network.

One should appreciate that the disclosed techniques provide many advantageous technical effects including increasing available computing infrastructure available to user or devices without substantially interfering with data transport responsibilities. Furthermore, the disclosed techniques can be used to enhance efficiency of applications running on a fabric by estimating efficiency of a modified configuration of a topology, and then deploying such a configuration if the estimated efficiency is found acceptable.

Hybrid Fabric Apparatus Overview

Figure 1A:
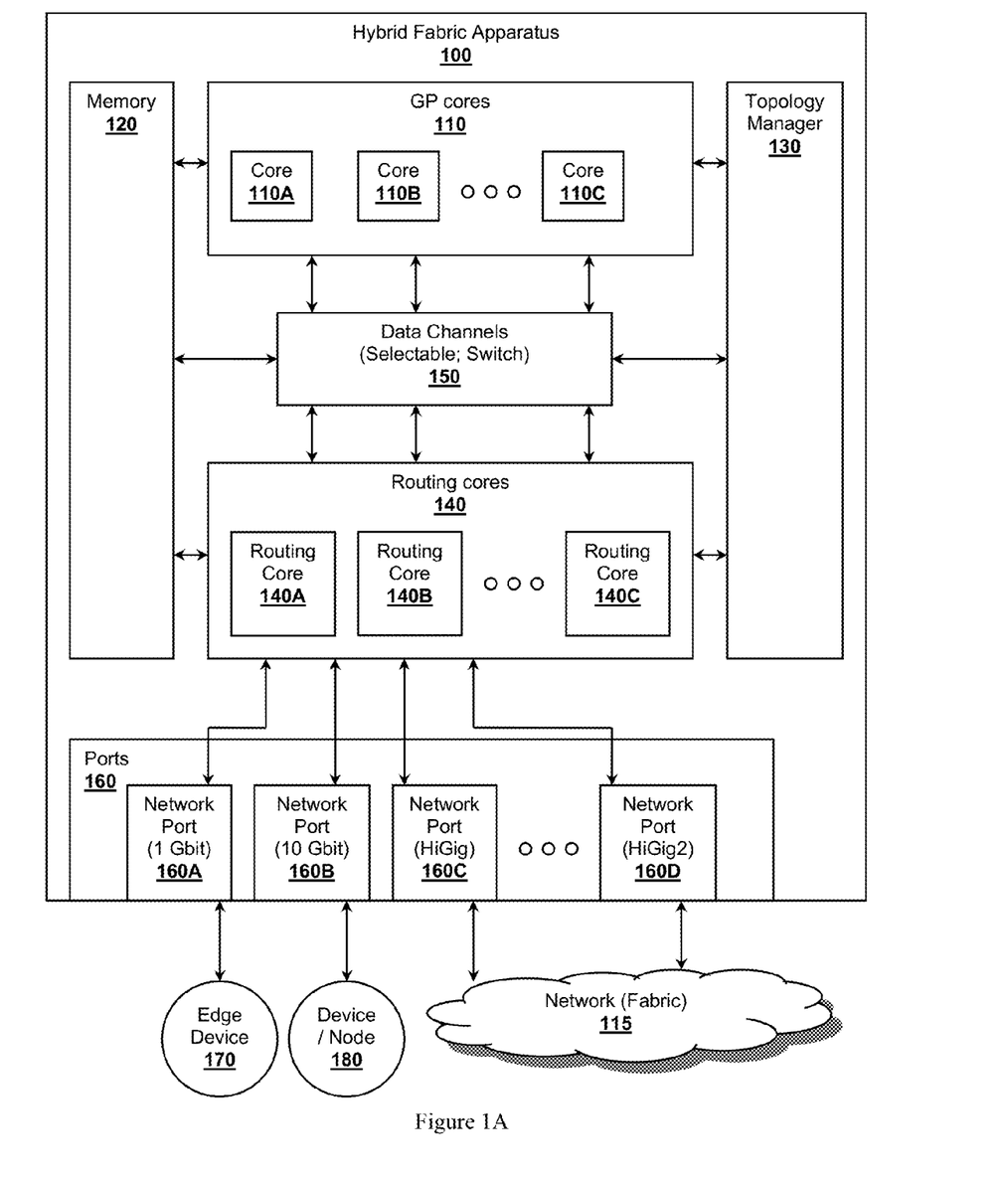
FIG. 1A is an overview of a contemplated hybrid routing—computation apparatus.

In FIG. 1A, hybrid fabric apparatus 100 represents a device capable of providing data transport across a network fabric while simultaneously supporting multiple application topologies. Preferred apparatus 100 are configured to operate as a hybrid routing—computation fabric apparatus supporting dedicated packet switching data transport across a network fabric 115 while also providing support for general purpose application computation. Apparatus 100 preferably comprises a plurality of General Purpose (GP) processing cores 110 as represented by cores 110A, 110B, and 110C; routing cores 140 as represented by routing cores 140A, 140B, and 140C; and a plurality of externally facing networking ports 160 as represented by ports 160A, 160B, 160C, and 160D. Apparatus 100 can also include memory 120 configured to store software instructions for execution on GP cores 110 or routing cores 140. Preferred embodiments also include topology manager 130 configured to manage how hybrid fabric apparatus 100 participates within one or more routing or other application topologies within fabric 115.

In some embodiments, apparatus 100 can also include data channels 150, preferably internal data channels. Data channels 150 represent communication data paths that communicatively couple GP cores 110 with routing cores 140, where any one of GP cores 110 can exchange data with one routing core 140 via a selected data channel 150. As illustrated, channels 150 can be embodied as an internal switch, possibly a physical switch or a virtual switch.

Topology manager 130 can dedicate a single channel 150 for use by a single GP core 110 and single routing core 140. For example, topology manager 130 can select a first channel for use by GP core 110A and routing core 140C in support of a topology, while a second, different channel can be dedicated for use by GP core 110B and routing core 140A in support of their topology. Selection of data channels 150 can be performed according to any desired criteria; possibly based requirements within a topology image file exchanged among multiple apparatus 100. The topology image preferably comprises sufficient information describing a whole topology across multiple fungible hybrid fabric apparatus 100 within fabric 115.

Routing cores 140 can collectively or individually be coupled with one or more of networking ports 160. Furthermore, routing cores 140 can communicatively and selectively coupled with networking ports 160 where any one routing core 140 can exchange data with remote devices via any one of networking ports 160. Routing cores 140 are preferably dedicated routing cores configured to route data packets from one of ports 160 to another according one or more routing rules. The routing rules for routing cores 140 can be embodied within a routing topology image file and can include a map of all routes from a first port 160 to all other ports within fabric 115.

Networking ports 160 provide a data exchange interface with other devices over fabric 115. Preferred networking ports 160 comprise externally facing ports. As shown, port 160A represents a 1 Gbit/s Ethernet interface, which can connect to typical edge devices. For example, port 160A can interface with edge device 170, possibly a desktop computer, a set top box, a printer, a server, a storage device, a router, or other type of computing device. Network ports 160 can be configured to support various interfaces including 10 Gbit/s interfaces as shown with port 160B, HiGig as shown with network port 160C, or HiGig2 as shown with networking port 160D.

Each type of interface provides for connectivity with different types of devices 170 or device/nodes 180. Higher bandwidth interfaces can couple with other nodes (e.g., other apparatus 100) or even higher performance edge devices. Yet higher bandwidth interfaces can couple with devices forming fabric 115 as desired. In some more preferred embodiments, ports 160 can be aggregated to form extremely high bandwidth connections over network 115. For example, multiple HiGig2 ports can be aggregated form a 30 Gbit/s, 50 Gbit/s, or even over 100 Gbit/s data connection between an adjacent apparatus 100.

Network ports 160 can also support more than one logical data channel per port. For example, networking port 160D can represent as single optic fiber physical connection and that can also support multiple logical data channels, each channel operating as a different wavelength of light. In such embodiments, the logical data channels can be considered a resource available for communication across the fabric, or even within or among topologies.

Although networking ports 160 are illustrated as wire-based or optic-fiber based ports, it should be appreciated the inventive subject matter can also be applied to wireless ports (e.g., 802.11x, 802.15.x, 802.16x, Ultra Wide Band, Wireless USB, cellular, etc.).

The various components of hybrid fabric apparatus 100 are configured to be logically modular where any one component can be communicatively coupled with other components. Topology manager 130 can dedicate a collection or a set of apparatus components for use with one or more routing or application topologies. As such, the apparatus components, even including logical components (e.g., logical data channels, memory maps, etc.) can be considered resources available for assignment. Internally, topology manager 130 can configured data channels 150 to provide internal communication paths among the components. Although not show, data channels 150 could also provide communication paths among routing cores 140 and networking ports 160.

Hybrid fabric apparatus 100 is contemplated to operate as a networking switch. FIG. 1A presents apparatus 100 as a networking switch functioning within a networking fabric 115. The apparatus components (e.g., memory 120, cores 110 and 140, ports 160, channels 150, etc.) can be housed within a single enclosure for use as a switch. However, one should appreciate that features of hybrid fabric apparatus 100 can be packaged according to different form factors other than an appliance level device. For example, in some embodiments, apparatus 100 can comprise a chip form factor package in which is disposed general purpose cores 110 and routing cores 140. The data channels 150 can include internal data paths of the chip and ports 160 can include pin out interfaces (e.g., PCIe, SERDES, Ethernet, USB, etc.) through which apparatus 100 can coupled with one or more physical connectors including physical networking jacks. Memory 120 can also be placed within a chip version of apparatus 100 as local caches, buffers, volatile or non-volatile memory, although substantial portions of memory 120 are contemplated to be external to the chip.

Preferred fabric apparatus 100 is fungible with other fabric apparatus 100, where each apparatus 100 can provide support for desired data transport topologies, or application topologies, just as well as other apparatus 100, subject to any physical connectivity issues. For example, topology manager 130 can operate locally to manage apparatus components for various topologies, or could also operate as a global topology manager to govern a fabric level topology as necessary. Such fungibility provides for ease of migrating functionality from one apparatus 100 to another apparatus 100 as discussed further below, possibly for optimization of a topology, increasing redundancy of an application topology or increasing security of topology.

Figure 1B:
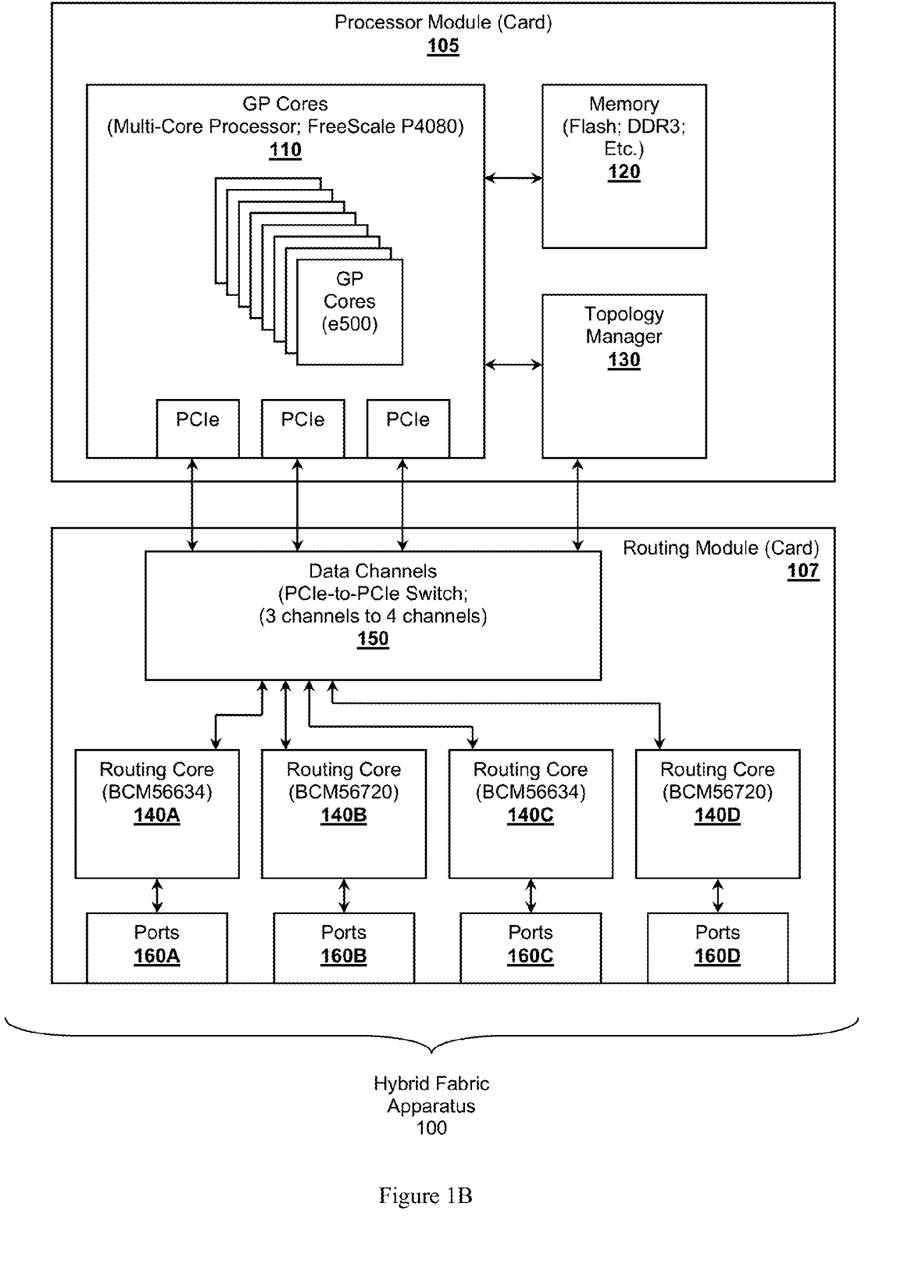
FIG. 1B is an example embodiment of a hybrid routing—computation apparatus implemented as two modular cards.

To further illustrates that hybrid fabric apparatus 100 can take on different forms, FIG. 1B presents a possible embodiment where apparatus 100 is comprised of multiple modular cards: processor module 105 and routing module 107. Processing module 105 comprise general purpose cores 110 and memory 120, while routing module 107 comprises routing cores 140 which connect to physical networking ports 160.

In the example embodiment illustrated, processing module 105 can be implemented as an independent PCB card using any suitable multi-core processor, a FreeScale™

P4080 for example. The P4080 is considered to be suitable in view that it offers eight e500 cores capable of being independently configured to execute software instructions as desired. The P4080 also comprises numerous interfaces including three PCIe interfaces, among others. Processing module 105 can also be outfitted with one or more memory units to form memory 120. Memory units can include flash, ROM, DDR3, caches, buffers, hard drives, solid state drives, or other types of tangible volatile or non-volatile memory. At the time of writing, preferably memory 120 can provide more than 8 GB, 16 GB, or even 32 GB of non-volatile memory for use by cores 110. It is contemplated that other multi-core processors could also be used in conjunction with the inventive subject matter including those offered by Intel®, AMD®, IBM®, Nvidia®, Sun Microsystems®, or others. For example, Intel's 50-core Knights Corner processor could be adapted for use with the disclosed inventive subject matter, where a portion of the cores could be configured as dedicate routing cores 140.

In a similar vein, routing module 107 can also be implemented as an independent PCB card that can connect with or couple with processing module 105 via a suitable connector. Routing module 107 can include data channels 150 in the form of a PCIe-to-PCIe switch to allow a limited number of PCIe channels from processing module 105 to access a larger number of routing cores 140. In the embodiment shown, the switch is configured to provide switching from three channels to four. Naturally, the actual number of data channels 150 can be greater than three or four to match requirements for a desired architecture. For example, there could be a number of data channels commensurate with the number GP cores 110, or routing cores 140.

One should keep in mind that individual ones of data channels 150 can be selected by topology manager 130 as being dedicated to a topology. Topology manager 130 can provide control instructions to the switch to control which of data channels 150 are bound to one or more sets of GP cores 110 and routing cores 140.

Suitable routing cores 140 are available from Broadcom™ and are represented by routing cores 140A through 140D. Broadcom provides numerous different multilayer integrated switch silicon solutions that are considered suitable for use with the disclosed subject matter as dedicated routing cores. For example, routing core 140A can include a BCM56634 capable of supporting 48 physical ports or four 10 Gbit/s as indicated by ports 160A. Ports 160A can include 10, 100, or 1000 Mbit/s copper wire connections. Routing core 140B and 140C illustrate that a BCM56720 can be used to provide update 16 fiber optic ports 160B or 160C. Routing core 140D represents yet another example where a BCM56821 can be used in connection with optic fiber ports 160D. It should be appreciated that the Broadcom versions of routing cores 140A through 140D are provided as an example only and should not be construed as limiting the inventive subject matter.

Ports 160 can also be driving by higher capable chips, possibly including Intel® LightPeak™ chip capable of supporting up to 10 Gbit/s on a single channel. Even higher data rates can be achieved through Intel's recently announced photonic-based chip supporting four data lasers capable of driving throughput up to 50 Gbit/s on a single fiber. It is specifically contemplated that multiple ports 160 driven by such photonic-base chips can be aggregated to achieve bandwidths greater than 100, 200, or even 300 Gbit/s across a distributed core fabric as discussed herein, even across vast geographic distances.

Software running on hybrid fabric apparatus 100 can be stored in memory 120 and can take on many different forms. In some embodiments, apparatus 100 operates under a single general purpose operation system (e.g., Linux™, Windows®, VxWorks™, etc.). It is also contemplated that each core could run a different operation system or possibly run its own instance of an operating system. Such configurations can be dictated by requirements of a routing or application topology. Control over the homogenous or heterogeneous mix of operating system can also be managed by a hypervisor as desired to map the virtual nature of the execution environment to the hardware of apparatus 100. It is also specifically contemplated apparatus 100 could support a distributed hypervisor capable of managing multiple operating systems within single application topology across multiple fungible apparatus 100 deployed over a network.

FIG. 1B illustrates one possible embodiment based on a multi-card system comprising GP cores 110 and routing cores 140. One should appreciate the inventive subject matter can incorporate additional apparatus components beyond those presented in FIG. 1B. For example, different types of processing cores could be incorporated into the design possibly including graphic processing cores, storage partitions, sensor arrays, I/O devices, or other components that could be considered local to apparatus 100. Each of these other types of apparatus components could also be assigned or otherwise dedicated to a routing or application topology.

Topology Management

Topology manager 130 represents a management module within apparatus 100 to manage local apparatus components (e.g., GP cores 110, routing cores 140, ports 160, memory 120, etc.) with respect to one or more application topologies. Topology manager 130 is configured to coordinate one or more topologies (e.g., a routing topology, application topology, etc.) with other fungible hybrid apparatus 100. Through coordination, typically via exchanging one or more topology definition image files, topology manager 130 dedicates GP cores 110, routing cores 140, networking ports 160, or other apparatus components to the topologies. For example, topology manager 130 might dedicate GP cores 110A, routing core 140A, and networking port 160A to a computation topology while topology manager 130 might also dedicate only routing core 140C and networking ports 160C and 160D to a routing topology used for general data transport across fabric 115.

A topology is considered a manageable object representing a logical configuration of devices communicatively coupled with each other via data channels that coordinate their functionalities to form an infrastructure for routing or computation. Topologies can be managed locally by topology manager 130 or globally by a global topology manager. A topology can include assignments of global resources (e.g., two or more of apparatus 100) that combine to function as a whole according to a defined application topology. One should note that a global topology does not necessary require knowledge of local apparatus components dedicated to the topology. Additionally, topology manager 130 could simultaneously manage local apparatus components assigned to a topology and manage a global fabric level topology governing multiple apparatus 100.

Topology manager 130 provides a mapping between how apparatus 100 fits within a global topology at the local apparatus component or resource level. Topology manager 130 can provide local topology status information to global topology managers as desired. In some embodiments, local apparatus status information can remain transparent to the global topology manager. For example, topology manager 130 can rotate apparatus components into or out of a topology as dictated by appropriately defined topological criteria while the global topology remains substantially unaffected or unaware of changes of internal apparatus components.

It should be appreciated that an apparatus can be a member of more than one topology. In such scenarios, topology manager 130 manages local resources for multiple topologies. Each of the topologies can be referenced by a topology identifier, possibly within a topological namespace that indicates interrelationship among topologies. A topology can co-exist with other topologies, can be co-extensive with other topologies, can overlap with other topologies, or otherwise exist in multi topology environment.

Based on topological requirements, topology manager 130 determines which of the local components, if any, can be dedicated to the topology. One should note the physical apparatus resources (e.g., a port 160A, GP core 110, etc.) can be allocated to one or more topologies if requirements dictate. For example, port 160C can include a multi-channel fiber optic connector capable of supporting different wavelengths of light for each logical channel. Port 160C can be dedicated to a first routing topology using a first wavelength for a data channel while it can also be dedicated to an application topology that utilizes a second wavelength as its data channel.

Topology manager 130 is configured to manage the apparatus components, physical or logical, by dedicating the components to the topologies. One should appreciate topology manager 130 is configured to handle more than one co-existing, even heterogeneous, topologies where topology manager 130 can manage components according to topology type. For example, a computation topology might require additional GP cores 110 for computation, while a storage topology might require additional ports for high bandwidth throughput to a storage device.

Apparatus components can be dedicated to topologies according various schemes or algorithms. Upon reception of a topology image file, topology manager 130 can analyze the definition to determine which apparatus components would be required to fulfill the roles or responsibilities of apparatus 100 within a topology. Roles or responsibilities can be determined from a topology image definition file, topology identifier (e.g., name in a name space), or other encoded information. For example, a software application topology definition could include a required number of GP cores 110, memory requirements, application code, memory map, exposed APIs, or available remote resources. Topology manager 130 can dedicate apparatus components based on the explicit requirements or inferred requirements of the topological definition.

Apparatus 100 is configured to participate in multiple topologies simultaneously, including topologies of different types. In a preferred embodiment, apparatus 100 supports a routing topology operating as a general data transport structure allowing edge devices to exchange data. In addition to a routing topology, apparatus 100 can support other application topologies configured with specific functionality. Of myriad possible topologies, example application topologies can include database topologies, storage topologies, simulation topologies, model topologies, graphic management topologies (e.g., for rendering or display), or other types of topologies.

Figure 2A:
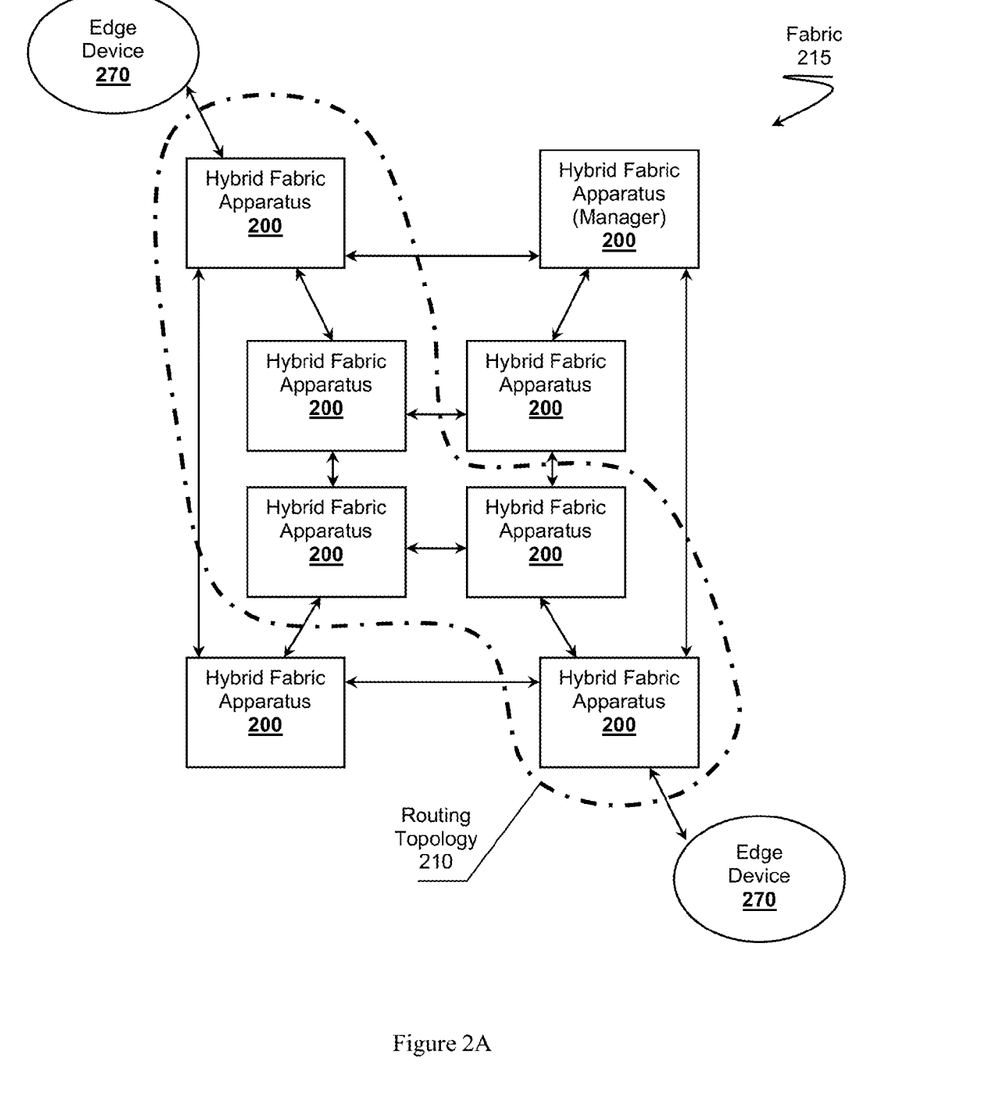
FIG. 2A illustrates a hybrid fabric comprising a routing topology between edge devices.

FIG. 2A presents an example of routing topology 210 within fabric 215. Routing topology 210 provides for general data transport between edge devices 270 communicatively coupled with each other through fabric 215. In routing topology 210, each of apparatus 200 dedicates its own apparatus resources for use in general data transport. Routing topology 210 can be defined by a routing topology definition file, referenced as a topology image, detailing possible routes through routing topology 210. As each apparatus 200 receives a data packet, apparatus 200 can inspect the packet to determine which apparatus 200 the packet is destined or to which port in topology 210 the packet is destined. Apparatus 200 consults the routing topology image to determine to which of its ports the packet should be directed to continue its journey toward its destination. Suitable routing capabilities that can be adapted for use with the disclosed techniques are described in co-owned U.S. Pat. No. 7,352,745 titled "Switching System With Distributed Switching Fabric".

Routing topology 210 can be established by disseminating the routing topology image to all of apparatus 200 that participate within routing topology 210. Routing topology 210 can be managed by a routing topology manager possibly located one of apparatus 200 functioning as a global fabric manager (see top right apparatus 200). One should note that the physical ports of each apparatus that are dedicated to routing topology 210 might be determined by the physical connectivity of apparatus 200 as opposed to being determined by preferences of a local topology manager. However one should also note that a routing core of apparatus 200 can be assigned as desired by a local topology manager as the local routing core might have little impact of routing topology 210. In similar vein, logical data channels used to communicate among apparatus 200 in routing topology 210 could also be assigned or negotiated locally between adjacent apparatus 200. More specifically, routing topology 210 could use a common data channel (e.g., wavelength of light on optic fiber connections) or could use a heterogeneous mix of logical data channels.

Typically an apparatus's topology manager will dedicate at least two networking ports and a routing core to routing topology 210. The two networking ports could be physical ports, or could be logical data channels on the same physical ports, or any combination of physical or logical ports. The routing core can provide packet routing, even cut through routing, without requirement engagement of a GP core. Still, in some embodiments a GP core can be dedicated to routing topology for various reasons possibly including deep packet inspection, defense in depth security (e.g., distributed firewall), or other networking applications.

In view that routing topology 210 provides for general data transport across fabric 215, it should be appreciated that routing topology 210 can represent a foundational topological object for other types of topologies deployed through fabric 215. It is specifically contemplated that topologies in the fabric, related topologies or orthogonal unrelated topology, can be organized according to an ontology or taxonomy that describes the topological functional interactions. For example, topologies can be organized according to a hierarchy where a simulation topology depends on a computation topology which can depend on a routing topology for data transport.

Figure 2B:
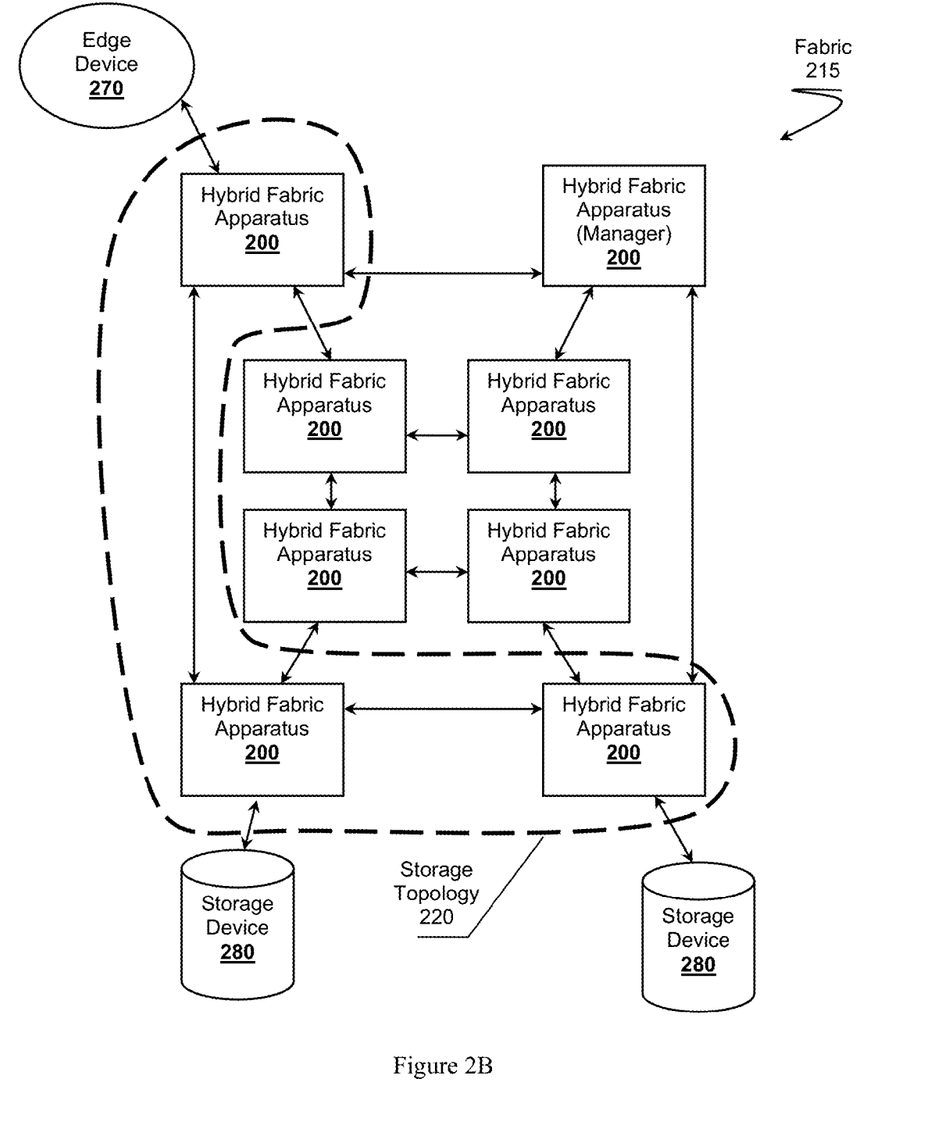
FIG. 2B illustrates the hybrid fabric from FIG. 2A comprising a storage topology between an edge device and storage devices.

FIG. 2B provides a further illustration of another possibly type of topology, an application specific topology represented by storage topology 220 deployed within fabric 215 of FIG. 2A. Storage topology 220 has some similarities to routing topology 210 given that edge device 270 communicates with one or more of storage device 280, which can also be a considered an edge device. In such an embodiment, storage topology 220 can include a routing topology that routes storage packets from edge device 270 to storage devices 280. The routing topology of storage topology 220 can utilize a completely different data channel than data channels utilized by routing topology 210 to reduce the impact between the routing topologies.

On the surface storage topology 220 appears to be no different from a routing topology. One should keep in mind that each apparatus 200 within storage topology 220 can also monitor storage packets as they traverse fabric 215. Each apparatus 200 that is a member of storage topology 220 can be configured to execute one or more storage algorithms as applied to the storage packets. The algorithms can be configured to handle various storage related functions including mirroring, striping, RAID functions, parity calculations, file access, writes, reads, or other storage related roles or responsibilities. For example, consider mirroring. When a write request is received from edge device 270, a GP core of the apparatus 200 connected with edge device 270 can duplicate the request and send the duplicated write requests to each of storage device 280. Striping can be handled in a similar way by routing data packets to different storage devices according to a striping algorithm.

Existing storage protocols, or even those yet to be created, can be integrated into storage topology 220. Example storage protocols that can be suitably adapted for use within store topology 220 include iSCSI, ATA over Ethernet, Fibre Channel over Ethernet, Fibre Channel over IP, Internet Fibre Channel Protocol, Internet Storage Name Service, CIFS, or other storage networking protocols. One should note that storage topology 220 can be configured to operate at various levels of a storage protocol stack from the physical layer, link layer, networking layer, transport layer, or even up to the file system level. In fact, storage topology 220 can also be configured to operate as a distributed core edge cache at the various layers of the storage protocol stack where each apparatus stores portions of a storage data set.

Figure 2C:
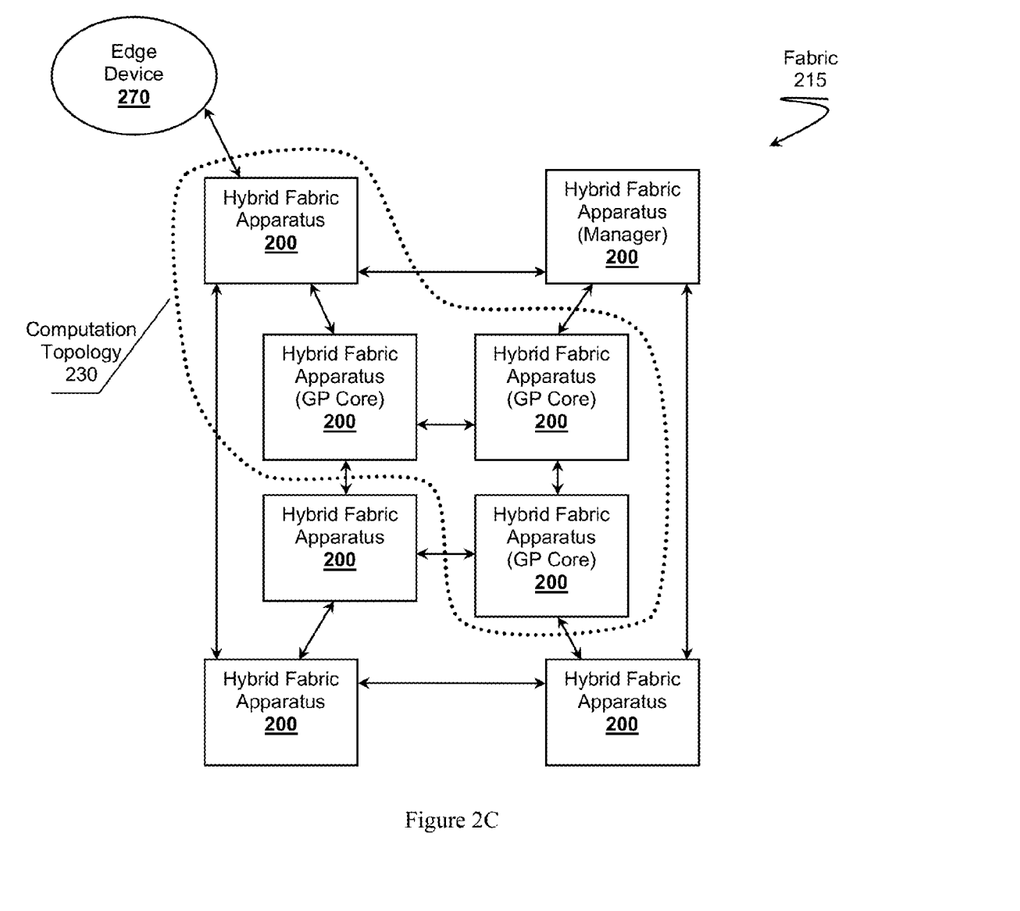
FIG. 2C illustrates the hybrid fabric from FIG. 2A comprising a computation topology.

Yet another example of an application specific topology is represented by computation topology 230 in FIG. 2C. Computation topology 230 can also reside within fabric 215, even co-existing with storage topology 220 or routing topology 210. Computation topology 230 represents a topology constructed as infrastructure to support desired calculations of a software application, where one can consider computation topology 230 as a distributed core processing engine. Computation topology 230 can be configured to support various forms of computing infrastructure including having access to data inputs (e.g., local or remote peripherals, keyboards, sensors, etc.), or data outputs (e.g., memory, storage, printers, displays, etc.).

Computation topology 230 comprises a plurality of GP cores located in member apparatus 200, where the topology manager in each apparatus 200 has dedicated the GP core to computation topology 230. As the computation topology 230 executes its application, data can be sent from one member to another as desired based on an application map within an image file. Each GP core can be individually or collectively configured to generate data, inspect data, transform data, or otherwise operate on data in support of the application.

As with storage topology 220, computation topology 230 can also leverage other types of topologies as infrastructural elements. For example, computation topology 230 could leverage storage topology 220 for long term storage while also utilizing a routing topology to exchange data among members of computation topology 230.

Computation topology 230 can take on many different forms reflective of myriad types of application topologies. Example computing topologies include database topologies, parallel processing topologies, simulation topologies, modeling topologies, security topologies (e.g., defense-in-depth applications operating as a distributed firewall), game topologies, or other types of software application topologies. Simulation topologies and modeling topologies are two especially interesting types of application topologies that can be used to optimize other topologies within fabric 215 as discussed with reference to FIG. 4.

A simulation topology is considered to be a topology supporting a software application operating as a topological simulation running on GP cores of apparatus 200. Preferred simulation topologies simulate another topology deployed on the fabric 215, possibly routing topology 210 or storage topology 220. Providing access to such simulation topologies allows for estimating efficiencies of existing topologies, which in turn provides for optimizing the existing topologies through recommended reconfigurations that might improve efficient. A simulation topology is preferably orthogonal to other topologies in fabric 215 in the sense that the simulation topology lacks a substantial impact on the throughput of other topologies (e.g., less than 5%). Additionally, the simulation topology preferably is not impacted by other topologies of fabric 215.

A modeling topology is similar to simulation topology in the sense the modeling topology models another topology as opposed to simulates the topology. The distinction arises from how the two types of topologies affect or are affected by characteristics of fabric 215. A modeling topology is preferably affected by one or more performance properties of fabric 215 in order to generate a more realistic model. For example, computation topology 230 can execute normally within fabric 215 while a modeling topology can mirror the functionality of computation topology 230 and can execute within an similar environment (e.g., have similar bandwidth, latency, routes, etc.). The modeling topology can then be adjusted to determine if an estimated efficiency of the modeled topology can be improved. If a more efficient configuration is found, computation topology 230 can be reconfigured, or the mirror topology can simply become the computation topology 230 while deconstructing the old, less efficient computation topology 230, assuming any required synchronization is completed. In short, a simulation topology operates within a computational structure largely unaffected by performance of fabric 215, while a modeling topology experiences at least some of the same external factors that an existing topology experiences (e.g., traffic loads, lost connections, etc.), which represents a more realistic environment.

Topology Deployment

One should keep in mind that apparatus 200 are considered to be fungible with respect to their roles or responsibilities. Any one of apparatus 200 could take on the global fabric manager roles, responsibilities, or functions. Example fabric management capabilities can be found in co-owned U.S. Pat. No. 7,548,545 titled "Disaggregated Network Management". Such a possibility also applies to global topology management where at least one apparatus 200 can operate as a global topology manager for one or more application topologies. The global topology manager can be positioned at any apparatus 200 within fabric 215, or even in an edge device 270 that is suitably configured. Furthermore, the global topology manager can migrate to other locations as desired according to one or more security algorithms to provide further security.

A global topology manager preferably operates at the fabric level and can manage various apparatus 200 within an application topology, while lacking knowledge of which apparatus components have been dedicated to the application topology. The global manager can observe one or more performance metrics associated with fabric 215 in general or associate with the deployed application topologies to determine how best to construct a topology to fulfill the application topology's requirements.

Figure 3:
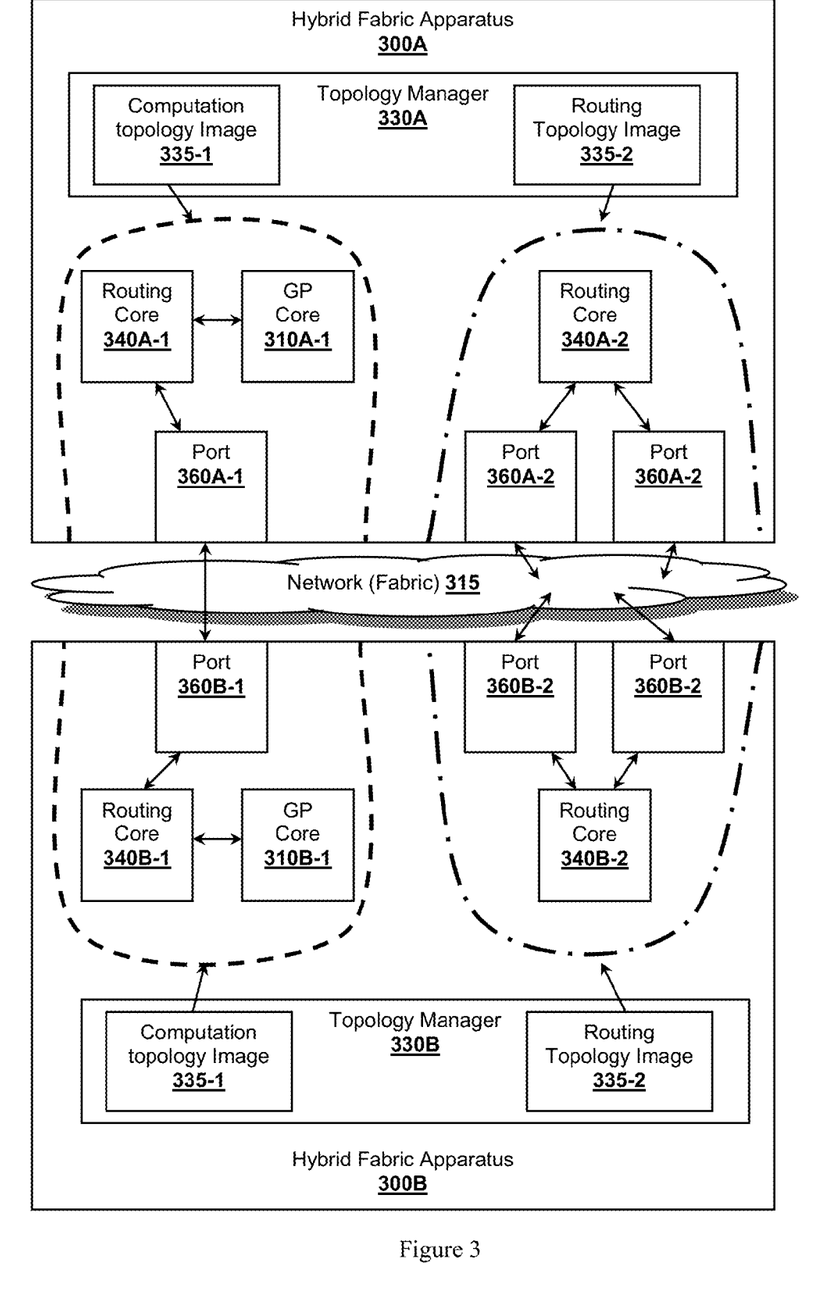
FIG. 3 provides an example of apparatus components dedicated to different topologies.

FIG. 3 provides a more detailed view of deployment of application topologies within network fabric 315 and on hybrid routing—computation apparatus 300A and 300B. One or more global topology managers have defined topology images for each of the desired topologies. In the example shown, a computation topology is defined by computation topology image 335-1 comprising information relating to the structure a desired computation topology. Similarly routing topology image 335-2 has information defining the structure of a desired routing topology. The global topology managers disseminate images 335-1 and 335-2 to member apparatus 300A and 300B. Note that both the routing topology and computation topology co-exist. It is also possible that the two topologies could be co-extensive or otherwise overlap. For example, routing topology image 335-2 could define a routing topology for use by the computation topology.

Topology images 335-1 and 335-2 comprise sufficient information to describe a deployed topology at a fabric-level. For a routing topology, the information can include a listing of routes from one port to other ports, even all other ports, in the routing topology. As packets are routing through apparatus 300A or 300B, routing cores 340A-2 and 340B-2 can analyze the packets and determine how to route the packet through their respective ports toward their destinations based the information routing topology image 335-2. Similarly, computation topology image 335-1 can include information describing a computation topology. Example information that can be within computation topology image 335-1 includes one or more topology identifiers, relationship among topologies, memory maps for the computation topology, executable code or pointers to code (e.g., URLs, APIs, etc.), computational requirements, storage locations, management channel identification information, back channel identification information, security tokens, urgencies, priority, local or global metric information, optimization parameters, or other information required for a target application.

Consider computation topology image 335-1, upon establishment of a corresponding computation topology, computation topology image 335-1 can be disseminated among the member apparatus 300A, 300B, or others within the computation topology. Topology managers 330A and 330B review image 335-1 to determine requirements for local apparatus components to support the required computation topology. Topology managers 330A and 330B can assign one or more of their apparatus components to the computation topology. For example, topology manager 330A has assigned routing core 340A-1, GP cores 310A-1, and port 360A-1 to the computation topology and topology manager 330B has assigned routing core 340B-1, GP cores 310B-1, and port 360B-1 to the same computation topology. Similarly topology manager 330A dedicates at least two of networking ports 360A-2, and routing core 340A to the routing topology, where these apparatus components are selected based on routing topology image 335-2. Although local apparatus component information is not necessarily required at the fabric level, it is contemplated that port assignment information, memory map information, or other physical-to-logical mappings would be advantageously reported to a global topology manager for dissemination to the members.

Topology managers 330A and 330B can determine which resources should be allocated to the various topologies as desired. In some embodiments, apparatus components are managed via one or more lists detailing the status of each apparatus component. In yet other embodiments, topology manager 330A and 330B can discover which components are available, even if the apparatus components are external to apparatus 300A or 300B (e.g., a connected edge device, storage device, display, etc.). Once topology managers 330A or 330B have committable resources, they can begin preparing for actual execution an application on the computation topology. One aspect of the inventive subject matter is considered to include exchanging commitment levels among members of a topology, including exchanging commitment levels with a global topology manager to deploy the target application topology. Commitment levels can include various status information including ready to deploy, insufficient resources, acquiring resource, time limit for which commitment is value, expected performance impact, or other information.

As discussed previously, application topologies can co-exist, can be nested, can overlap, or even be co-extensive. In some embodiments, topology manager 330A or 330B can select apparatus components to ensure the locally deployed topologies have a desired level of impact with respect to one another. As shown, the computation and routing topologies are essentially orthogonal, lacking any substantial impact on one another. However, one should note that in some scenarios an impact would be desirable. For example, computation topology image 335-1 might define a modeling topology that models the routing topology defined by routing topology image 335-2. In such a scenario, it would be desirable to have the modeling topology experience similar conditions as those experienced by the modeled routing topology.

To continue with the modeling example further, the modeling topology could overlay the modeled routing topology so that the exact same ports could be used for both. The exceptions would be that the modeling topology would likely utilize a different data channel on the ports than the routing topology and the modeling topology could also have a dedicated GP core for analysis purposes where the routing topology would likely lack a GP core.

As discussed previously, apparatus components dedicated to topologies might remain hidden from view of other apparatus. For example, GP core 310A-1 would likely remain out of view of apparatus 300B, while the functionality of GP core 310A-1 remains exposed, possibly as an API. Topology managers 330A and 330B can be considered to offer a mapping from the virtual or logical structure of the various topologies to the local physical apparatus resources.

Given that application topologies can be arranged according to various taxonomies or ontologies and that application topologies can be considered distinct manageable objects, one should also appreciate that deployed topologies can inherit properties from other topologies as determined by their links within the management space. For example, a computation topology can inherit security features from a storage topology, which in turn inherits data channels from an underlying routing topology.

Application topologies provide an interesting framework for deploying numerous classes of application topologies representative of possible classification schemes. To use a storage metaphor, application topologies can be mirrored, stripped, layered, or otherwise organized as desired. A mirrored topology could represent two application topologies that mirror each other while being part of a parent topology. Mirroring provides for redundancy or security should one of the mirrored topology lose coherency. Striping provides for breaking a topology into smaller sub topologies that can be distributed through a fabric, possibly where the sub-topologies can be rotated periodically for security purpose. Naturally, topologies could be mixed to create mirror-striped topology.

As an example, of a stripped-mirror topology consider a defense in depth application were a distribute core firewall application topology is deployed in a fabric. Ports on one edge of the fabric could represent an ingress point to a corporate network while ports geographically separated, possibly across the country, from the ingress port facing the internal corporate network. As package enters the fabric, a routing topology routes the packets appropriately. A computation topology conducts filtering operations on the packets as the packets penetrate deeper and deeper into the fabric toward the corporate network. Each layer could be implemented as a striped topology. In addition, a mirrored topology could be deployed that shadows the distributed filtering application. The shadowed topology can conduct deep-packet inspection without affect latencies of the actual routing topology. Thus further analysis can be conducted without alerting an entity that is seeking to comprise the corporate network.

Contemplated topological classification schemes including hierarchical, N-cube, mesh, star, hub-and-spoke, or other organizational structures. One should note the distinction between organization of topologies relative to each other and an organization of a specific topology. The classification of a topologies represent how multiple topologies relate to each other (e.g., functionally, logically, etc.) rather than how apparatus or apparatus components in a topology are deployed.

Application Topology Optimization

Network fabrics configured for data transport, especially across geographical distances, are very dynamic structures constantly under an onslaught varying demands. As conditions in the fabric change, the conditions can affect the various topologies deployed there. As with any network, if a traffic load exceeds a capacity of a physical link, latencies can increase in an undesirable fashion for packet transport. Similarly, such conditions can also affect other application topologies in an undesirable fashion. When conditions change in an unfavorable direction, the structure of an application topology can be changed to optimize the application topology's performance with respect to one or more performance metric.

Figure 4:
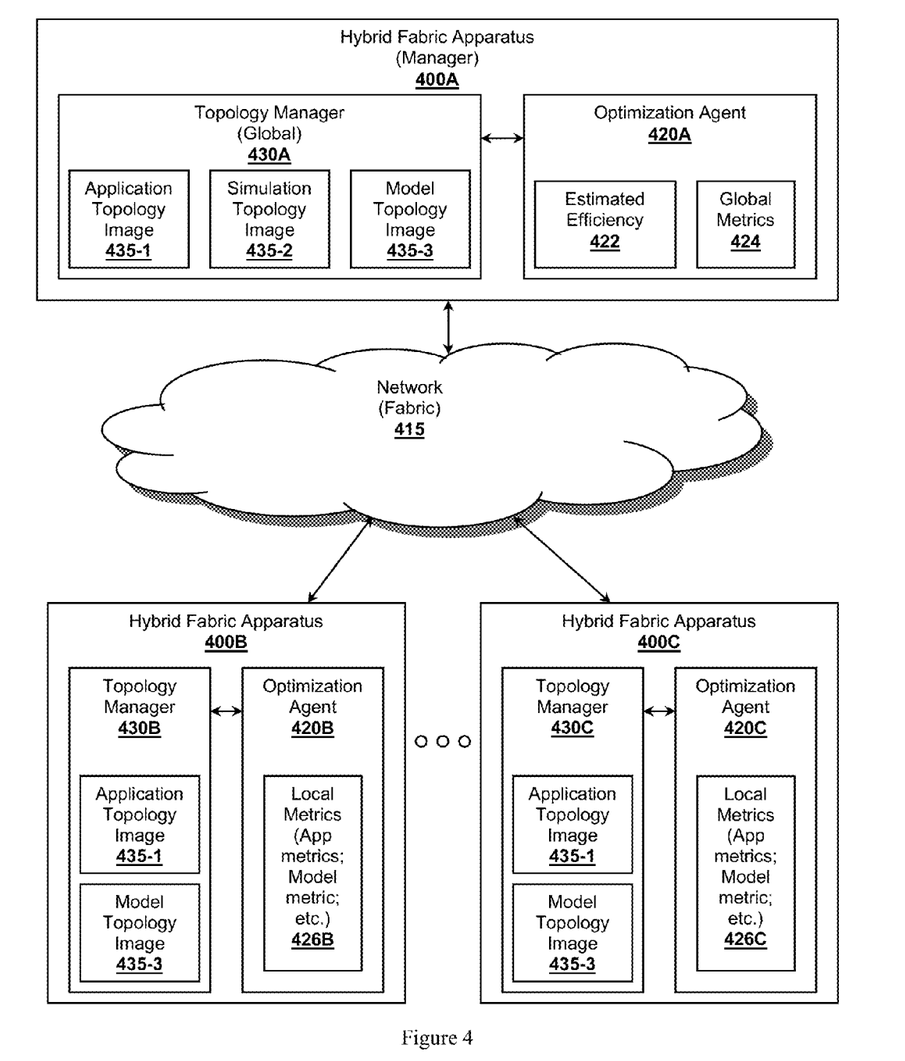
FIG. 4 is an overview of a fabric comprised of multiple hybrid routing—computation apparatus having optimization agents.

FIG. 4 illustrates fabric 415 having apparatus 400A, 400B, and 400C, collectively referred to as apparatus 400, where an application topology can be optimized. In addition to topology mangers 430A, 430B, and 430C, the apparatus can also comprise optimization agents 420A, 420B, and 420C, collectively referred to as agents 420. Apparatus 400A is considered a global manager which is configured to manage global aspects of the fabric, including one or more topologies. For example, apparatus 400A comprises global topology manager 430A, which manages the topologies defined by application topology image 435-1, simulation topology 435-2, and model topology image 435-3.

Agents 420 monitor, collect, or otherwise observe performance metrics of the apparatus, fabric, or topologies. In the example show, agent 420B collects local metrics 426B which are considered local to apparatus 400B. Optimization agent 420A can collect global metrics 424 relating to the fabric in general or to one or more complete topologies. In some embodiments, agent 420A aggregates local metrics 426B or 426C to form global metrics 424.

Application topology image 435-1 describes an application topology (e.g., computation, storage, database, routing, etc.) deployed on apparatus 400A and 400B, and possibly 400C, and is a target for optimization by global topology manager 430A and optimization agent 420A. Topology manager 430A cooperates with optimization agent 420A by comparing global metrics 424 with one or more optimization rules to determine an estimated efficiency 422 of one or more topologies.

Estimated efficiency 422 can be determined through many different approaches. In some embodiments, estimated efficiency 422 is simply calculated as a function of global metric 424. One should note the calculated estimated efficiency 422 can take into account fabric-level metrics, topology-level metrics from the target application topology or other topologies, or even apparatus-level metrics local 426B or 426C.

In yet other embodiments, estimated efficiency 422 can be determined by establishing a simulation topology as a computation topology defined by simulation topology image 435-2. The simulation topology can be configured to execute a simulation of the target application topology based on global metrics 424. The simulation can also leverage information from application topology image 435-1 to simulate the application topology. Apparatus 400A, operating as a global topology manger for the simulation topology, can deploy the simulation topology on fabric 415. As the simulation runs, optimization agent 420A can collect information from the running simulation to generate the estimated efficiency 422 of the simulation to determine if simulation's estimated efficiency is more agreeable than the estimated efficiency 422 of the application topology.

One should note that the simulation topology can be quite dynamic. Topology manager 430A can cause the simulation topology be altered according to requirements set forth in simulation topology image 435-2 to determine if the altered simulated topology gains an improvement in an estimated efficiency 422. For example, topology manager 430A can provide instructions to the simulation to reconfigure which apparatus in fabric 415 are simulated as members of the target application topology. As the simulation continues to run with its newly simulated configuration, a new estimated efficiency 422 can be determined. Again, if the newly estimated efficiency 422 is found to be acceptable, topology manager 430A can generated a new version of application topology image 435-1 to be disseminated among apparatus 400 in fabric to reconfigure the application topology accordingly. Naturally, topology manager 430A can take into account the cost of reconfiguration (e.g., down time, overhead, incurred latency, etc.) before determining a reconfiguration would be beneficial.

In a similar vein, estimated efficiency 422 can be estimated through establishing a modeling topology that models the target application topology according to modeling topology image 435-3. As with the simulation topology discussed above, global topology manager 430A can deploy the modeling topology within fabric 415 in a manner where the modeling topology experiences similar conditions as the target application topology. For example, apparatus 400B and 400C are both members of the application topology. Global topology manager 430A disseminates modeling topology image 435-3 to both apparatus 400B and 400C to construct a modeling topology that would experience the same conditions as the target application topology. Topology managers 430B and 430C can dedicate local apparatus components (e.g., GP cores, routing cores, memory, data channel, ports, etc.) according the requirements outlined in modeling topology image 435-1 so that the modeling topology is affected by fabric conditions at a desired level.

Global topology manager 430A monitors metrics associated with the modeling topology and derives an estimated efficiency 422 for the modeling topology. As with the simulated topology, if the modeled estimated efficiency 422 is considered acceptable, the application topology can be reconfigured accordingly. In some embodiments, the modeling topology can be constructed as mirrored or shadow topology to that of the target application topology. Once the modeling topology has been constructed with a suitable or acceptable arrangement with a desired estimated efficiency 422, global topology manager 430A can instruct the modeling topology to become the new application topology, once any appropriate synchronization efforts, if any, have been suitably completed.

One can consider reconfiguration an application topology through activating a mirrored topology as a cut-through reconfiguration. Once the mirrored topology has properly synchronized or established proper interconnections, it can simply become the active version of the application topology. Global topology manager 430A can then cause the resources dedicated to the old version of the application topology to be released. Such a cut-through reconfiguration can be achieved without incurring substantial impact on latency, bandwidth or other performance metric because the cut-through reconfiguration does not require halting activity within the old application topology to transfer resources over to the new application topology.

Simulation and modeling topologies can be altered as desired to improve estimated efficiency 422. First, one should appreciate that estimated efficiency 422 can be a single valued parameter (e.g., latency, bandwidth, computation time, power consumption, reliability, etc.) or multi-valued parameters associated with one or more topology properties or attributes. The properties of each topology can be adjusted as desired to determine how changes in the properties could affect each efficiency parameter. Properties that could be adjusted can include apparatus on which the topology is deployed, data channels, port assignments, location of code that is executing, proximity of executing code relative to other code or devices, proximity of one device to another, geo-location, time, data, or other properties. The properties can be adjusted according to various algorithms. Example algorithms that can be used to determine how to optimize estimated efficiency 422 can include genetic algorithms, neural networks, binary decision trees, A* search algorithms, or other approaches.

Estimated efficiency 422 is not required to depend solely on the target application topology to trigger a reconfiguration of the target application topology. In some embodiments, estimated efficiency 422 might depend in part, or even solely, on another different topology. For example, a routing topology efficiency could be more important that a gaming topology. In such a scenario, an estimated efficiency 422 of the routing topology would be used to determine how to reconfigure the gaming topology to improve the efficiency of the routing topology even if the gaming topology's efficiency is sacrificed. Thus, reconfiguration of a target application topology can be triggered by an increase or a decrease of estimated efficiency 422 of any topology within fabric 415.

The criteria for triggering a reconfiguration or redeployment of a target application topology based on estimated efficiency 422 can be defined automatically or by a user of fabric 415. The triggering criteria can include one or more rules that depend on various efficiency parameters, single or multi-valued, across one or more topologies. The rules can incorporate programmatic code where conditions are specified with logical operators as desired (e.g., AND, NOT, OR, XOR, etc.). One should keep in mind that the triggering criteria can also depend on fabric-level metrics, topology-level metrics, or apparatus-level metrics. As stated above, the triggering criteria can also depend on other parameters including time, date, geo-location, cost to reconfigure, security measures, amount of data to migrate, priorities, urgencies, environmental changes, connectivity, estimated security risk or exposure, or any other factors.

Once a reconfiguration or redeployment is triggered, global topology manager 430A can provide instructions to apparatus 400 on how to reconfigure the application topology. The instructions preferably takes on the form of an updated application topology image 435-1 disseminated to member apparatus, apparatus 400B or 400C for example. Based on the supplied instructions, reconfiguration can take place. It should be appreciated that reconfiguration can occur at the fabric-level where topological membership could change, at the apparatus-level, at the apparatus component-level, or even at a logical level (e.g., data channels, virtual mappings, etc.). For example, apparatus 400B might be removed from the application topology, while apparatus 400C might adjust the apparatus component dedicated to the application topology.

ADDITIONAL CONSIDERATIONS

One should further appreciate that the disclosed techniques provide for a distributed computational transport fabric where the fabric itself represents a computational infrastructure built on hybrid data transport—application fabric apparatus. Although the concepts have been largely presented within the context of a physical apparatus, it is also specifically contemplated that one or more layers of virtualization can be applied on top of the fabric or topology. From a virtual perspective, an application topology would appear substantially similar to other computer-based execution environments, possibly including a computer desktop. The inventive subject matter is also considered to include providing virtualization layers that integrate within existing system where an edge device (e.g., a computer, storage device, etc.) can be integrated with a topology.

Although topologies support an application, one should not confuse a topology as an application. It is true that there could be a one-to-one correspondence between applications and topologies. Rather, a topology is considered a configuration of infrastructure for an application and not the application itself.

It should be apparent to those skilled in the art that many more modifications besides those already described are possible without departing from the inventive concepts herein. The inventive subject matter, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

What is claimed is:

1. A hybrid routing—computation fabric card apparatus, comprising:
    a router comprising a plurality of routing cores and configured to route data among a plurality of network ports by executing software instructions according to a routing topology on at least one dedicated routing core from the plurality of the routing cores;
    a processor coupled with the router via at least one data channel and comprising a plurality of general purpose (GP) cores, the processor configured to execute software instructions according to an application topology on at least one dedicated GP core from the plurality of GP cores;
    a topology manager configured to coordinate the routing topology and the application topology with at least one other fungible hybrid routing—computation fabric card apparatus by dedicating at least one of the plurality of GP cores, the plurality of routing cores, and the plurality of networking ports to the routing topology and the application topology; and
    an optimizing agent configured to:
        observe performance metrics associated with at least one of the routing topology and application topology;
        estimate a performance efficiency with respect to at least one of the performance metrics based on a new configuration of the plurality of GP cores and the plurality of routing cores dedicated to the at least one of the routing topology and application topology; and
        cause reconfiguration of the plurality of GP cores and the plurality of routing cores that are dedicated to the at least one of the routing topology and application topology according to the new configuration upon the performance efficiency satisfying trigger criteria.

2. The apparatus of claim 1, further comprising a line card comprising the router and the processor.

3. The apparatus of claim 2, wherein the line card further comprises the optimization agent.

4. The apparatus of claim 1, wherein the router comprises a routing module card.

5. The apparatus of claim 1, wherein the processor comprises a processor module card.

6. The apparatus of claim 1, wherein the at least one data channel comprises an internal data channel between the router and the processor.

7. The apparatus of claim 1, wherein the at least one data channel comprises multiple channels.

8. The apparatus of claim 7, wherein the multiple channels include at least one of the following: a PCIe interface, a SERDES interface, an Ethernet interface, and a USB interface.

9. The apparatus of claim 1, further comprising a data channel switch configured to select channels from among the multiple channels.

10. The apparatus of claim 1, further comprising a plurality of networking ports.

11. The apparatus of claim 10, wherein the new configuration comprises at least some of the plurality of networking ports to be dedicated to the at least one of the routing topology and the application topology.

12. The apparatus of claim 10, wherein the plurality of networking ports comprises optic fiber connections.

13. The apparatus of claim 1, wherein the routing topology comprises a global fabric routing topology.

14. The apparatus of claim 1, wherein the application topology comprises a global fabric application topology.

15. The apparatus of claim 1, wherein the performance metrics comprise local metrics relative to the router and the processor.

16. The apparatus of claim 1, wherein the performance metrics comprise global fabric metrics.

17. The apparatus of claim 16, wherein the global fabric metrics comprise aggregated local metrics from a different apparatus.

18. The apparatus of claim 1, wherein the router comprises at least one computer chip form factor package that includes at least some of the plurality of routing cores.

19. The apparatus of claim 1, wherein the processor comprises at least one computer chip form factor package that includes at least some of the plurality of GP cores.

20. The apparatus of claim 1, further comprising a memory storing at least one topology image representative of the at least one of the routing topology and the application topology.

21. The apparatus of claim 1, wherein the application topology comprises at least one of the following: a storage topology, a computation topology, a simulation topology, a mirrored topology, a shadowed topology, and a modeling topology.

* * * * *